(12) United States Patent
Sugiyama et al.

(10) Patent No.: US 9,732,651 B2
(45) Date of Patent: Aug. 15, 2017

(54) ELECTRICALLY HEATED CATALYST DEVICE

(71) Applicant: TOYOTA JIDOSHA KABUSHIKI KAISHA, Toyota-shi, Aichi-ken (JP)

(72) Inventors: Natsuki Sugiyama, Nissin (JP); Hideji Naito, Tajimi (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 127 days.

(21) Appl. No.: 14/803,541

(22) Filed: Jul. 20, 2015

(65) Prior Publication Data

US 2016/0032806 A1 Feb. 4, 2016

(30) Foreign Application Priority Data

Jul. 29, 2014 (JP) ................................. 2014-153973

(51) Int. Cl.
| | |
|---|---|
| *B01D 50/00* | (2006.01) |
| *F01N 3/20* | (2006.01) |
| *F01N 3/28* | (2006.01) |
| *F01N 13/18* | (2010.01) |

(52) U.S. Cl.
CPC ......... *F01N 3/2013* (2013.01); *F01N 3/2026* (2013.01); *F01N 3/2828* (2013.01); *F01N 13/18* (2013.01); *Y02T 10/26* (2013.01)

(58) Field of Classification Search
CPC ....... F01N 3/2013; F01N 3/2026; Y02T 10/26
USPC .......................................... 422/174, 177, 180
See application file for complete search history.

(56) References Cited

U.S. PATENT DOCUMENTS

| | | | |
|---|---|---|---|
| 2012/0121476 A1* | 5/2012 | Kinoshita | B01D 53/94 422/174 |
| 2013/0224080 A1 | 8/2013 | Ishihara et al. | |
| 2015/0270026 A1* | 9/2015 | Izumi | H01B 1/08 428/116 |

FOREIGN PATENT DOCUMENTS

| | | | |
|---|---|---|---|
| JP | 2012061449 A | | 3/2012 |
| JP | 2013-136997 A | | 7/2013 |
| JP | 2013198887 A | | 10/2013 |
| JP | 2015-042860 | * | 4/2015 |

* cited by examiner

*Primary Examiner* — Tom P Duong
(74) *Attorney, Agent, or Firm* — Sughrue Mion, PLLC

(57) ABSTRACT

An electrically heated catalyst device includes: a carrier configured to carry a catalyst; a pair of electric diffusion layers formed on an outer peripheral surface of the carrier so as to be opposed each other; and wiring members each fixed to each of the electric diffusion layers, and the carrier is electrically heated via the wiring members. Each of the electric diffusion layers is formed so as to be divided into a plurality of regions in an axial direction of the carrier.

2 Claims, 7 Drawing Sheets

ELECTRICALLY HEATED CATALYST DEVICE

INCORPORATION BY REFERENCE

The disclosure of Japanese Patent Application No. 2014-153973 filed on Jul. 29, 2014 including the specification, drawings and abstract is incorporated herein by reference in its entirety.

BACKGROUND OF THE INVENTION

1. Field of the Invention

The present invention relates to an electrically heated catalyst device.

2. Description of Related Art

In recent years, an electrically heated catalyst (EHC) device has attracted attention as an exhaust gas purifier that purifies exhaust gas discharged from an engine of an automobile or the like. In the EHC, even under a condition in which a temperature of the exhaust gas is low and a catalyst is hard to be activated like just after engine start, it is possible to forcibly activate the catalyst by electrical heating and to raise purification efficiency of the exhaust gas.

In an EHC described in Japanese Patent Application Publication No. 2013-136997 (JP 2013-136997 A), an outer peripheral surface of a columnar carrier having a honeycomb structure and configured to carry a catalyst such as platinum or palladium is provided with a surface electrode extended in an axial direction of the carrier. Comb-shaped wiring lines are connected to the surface electrode, so that a current is supplied thereto. When the current expands in a carrier axial direction on the surface electrode, the whole carrier is electrically heated. This activates the catalyst carried by the carrier, so that unburned HC (hydro carbon), CO (carbon monoxide), NOx (nitrogen oxide), and the like in exhaust gas passing through the carrier are purified by catalytic reaction.

The inventors found the following problem about the electrically heated catalyst device. The abovementioned electrically heated catalyst device has such a problem that repetition (heat cycles) of increasing and decreasing a temperature causes a crack in the carrier, so that a current is hard to flow in some of the wiring lines and the current concentrates on other wiring lines, thereby causing melting.

The inventors searched a cause of the occurrence of cracks in the carrier. FIG. 7 is a graph illustrating temperature changes of a carrier and an electric diffusion layer in an electrically heated catalyst device in a related art. A horizontal axis indicates a time and a vertical axis indicates a temperature. As illustrated in FIG. 7, when the temperature increases (in an ON time of current application to the carrier), a temperature difference between the carrier and the electric diffusion layer formed right on the carrier increases, so that a thermal stress caused therebetween increases. This is presumably because a current easily concentrates on a central part of the electric diffusion layer, so that the central part of the electric diffusion layer is easily heated. Note that the electric diffusion layer is provided between the carrier and a surface electrode in order to expand electricity supplied from wiring lines to an axial direction and a circumferential direction of the carrier. The electric diffusion layer is omitted in JP 2013-136997 A.

SUMMARY OF THE INVENTION

The present invention provides an electrically heated catalyst device in which an occurrence of cracks in a carrier by heat cycles is restrained.

An aspect of the present invention relates to an electrically heated catalyst device including a carrier configured to carry a catalyst, a pair of electric diffusion layers formed on an outer peripheral surface of the carrier so as to be opposed each other, and wiring members each fixed to each of the electric diffusion layers. The carrier is electrically heated via the wiring members. Each of the electric diffusion layers is formed so as to be divided into a plurality of regions in an axial direction of the carrier.

In the electrically heated catalyst device according to the aspect of the present invention, since the electric diffusion layer is formed so as to be divided into a plurality of regions in the axial direction of the carrier, in an ON time of current application to the carrier, current concentration to a central part of the electric diffusion layer is dispersed. As a result, a temperature difference between the carrier and the electric diffusion layer in an OFF time of the current application is decreased, which decreases a thermal stress caused therebetween. Accordingly, it is possible to restrain an occurrence of cracks in the carrier due to heat cycles.

The carrier and the electric diffusion layers may contain SiC. Further, the electrically heated catalyst device may further includes a controller configured to control the current application to the carrier, each of the electric diffusion layers may be formed so as to be divided into two regions in the axial direction of the carrier. The wiring member fixed to the two regions may be formed so as to be divided electrically from each other. Two electric circuits may be provided, and in each of the two electric circuits, two regions of the electric diffusion layers which are diagonally opposed to each other via the carrier may be electrically connected to each other. The controller may alternately apply a current to the two electric circuits. With such a configuration, it is possible to further more effectively restrain an occurrence of cracks in the carrier due to heat cycles.

According to the present invention, it is possible to provide an electrically heated catalyst device in which an occurrence of cracks in a carrier due to heat cycles is restrained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes concrete embodiments to which the present invention is applied with reference to the drawings. However, the present invention is not limited to the following embodiments. Further, the following description and drawings are simplified appropriately for clarification of the description.

First Embodiment

Figure 1:
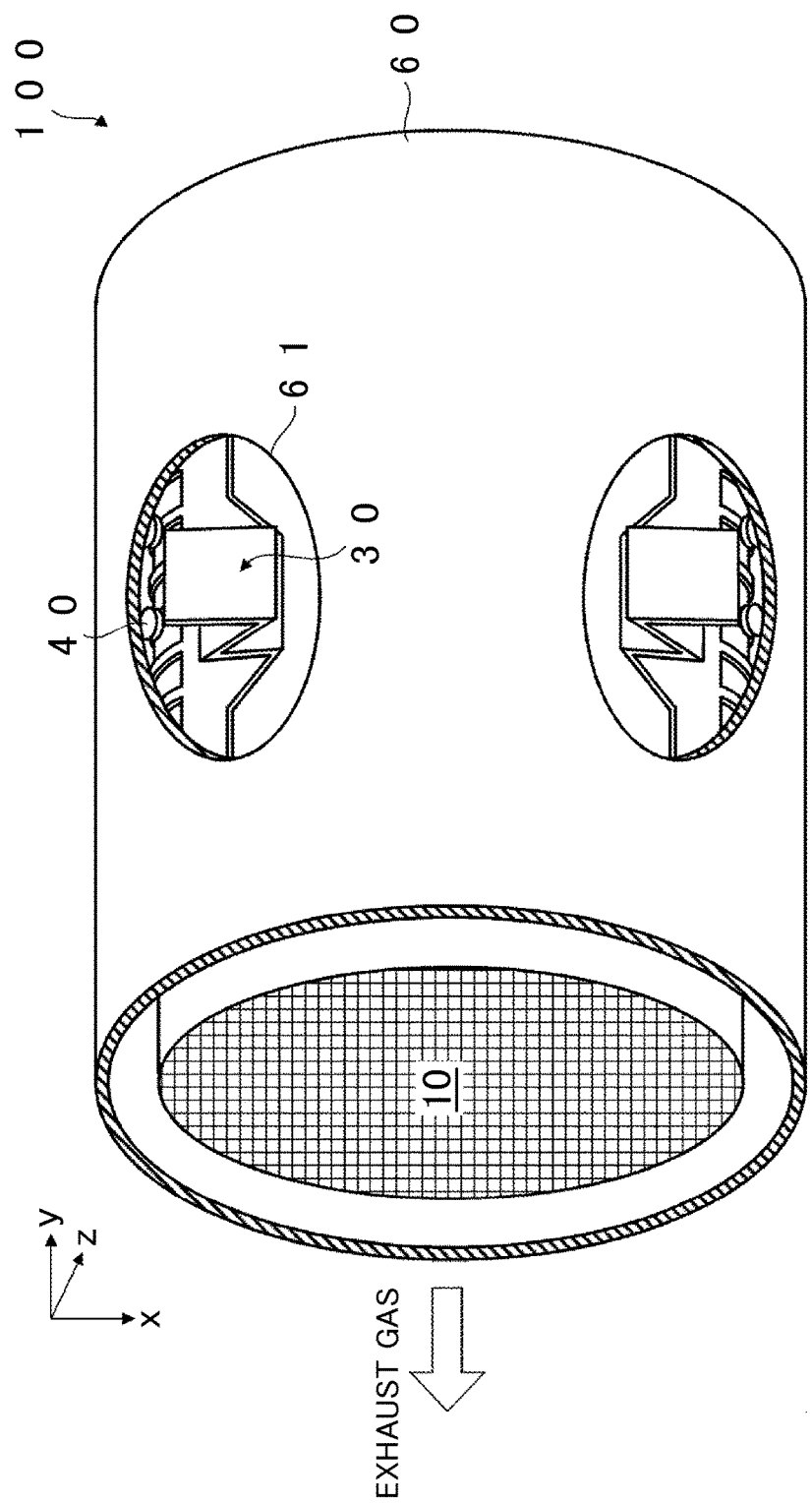
FIG. 1 is a perspective view of an electrically heated catalyst device according to a first embodiment.
Figure 2:
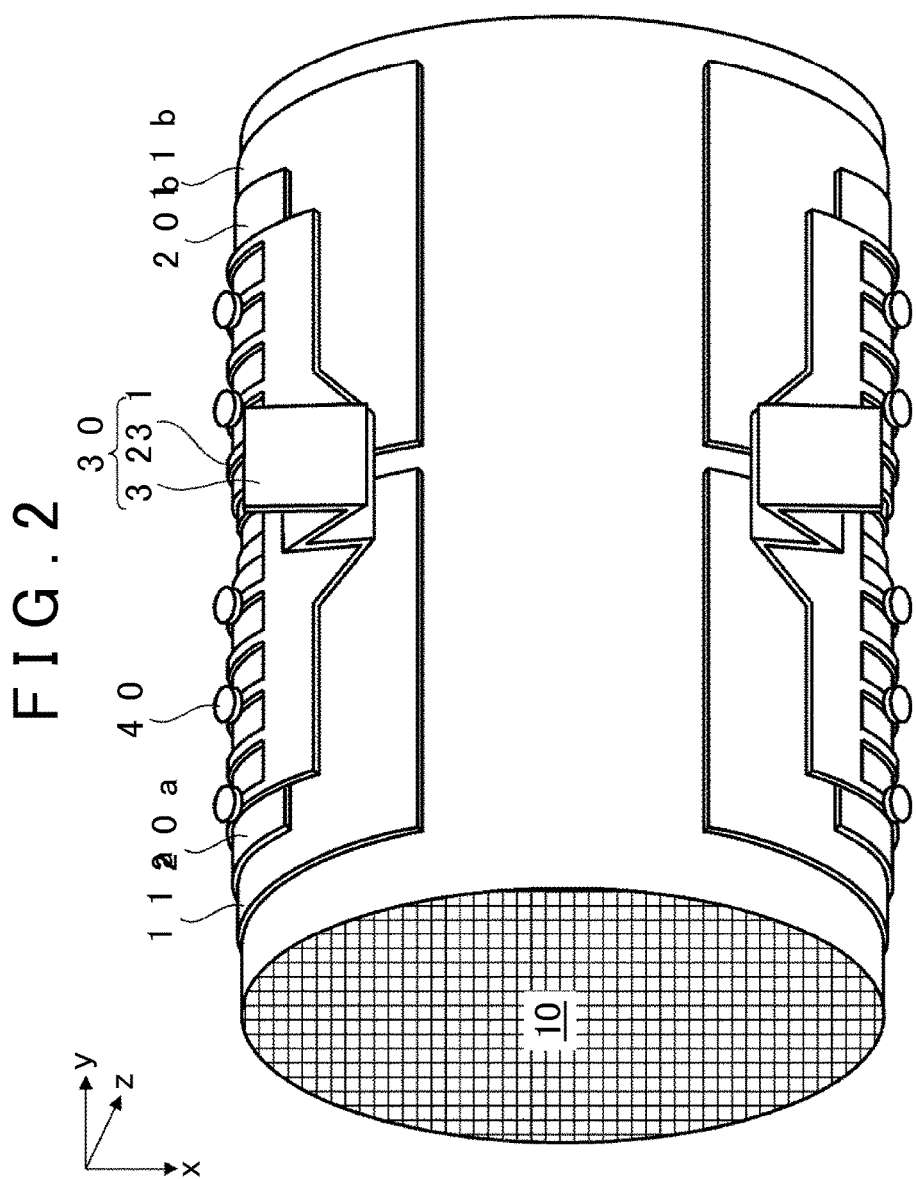
FIG. 2 is a perspective view in which an outer cylinder 60 is removed from FIG. 1.
Figure 3:
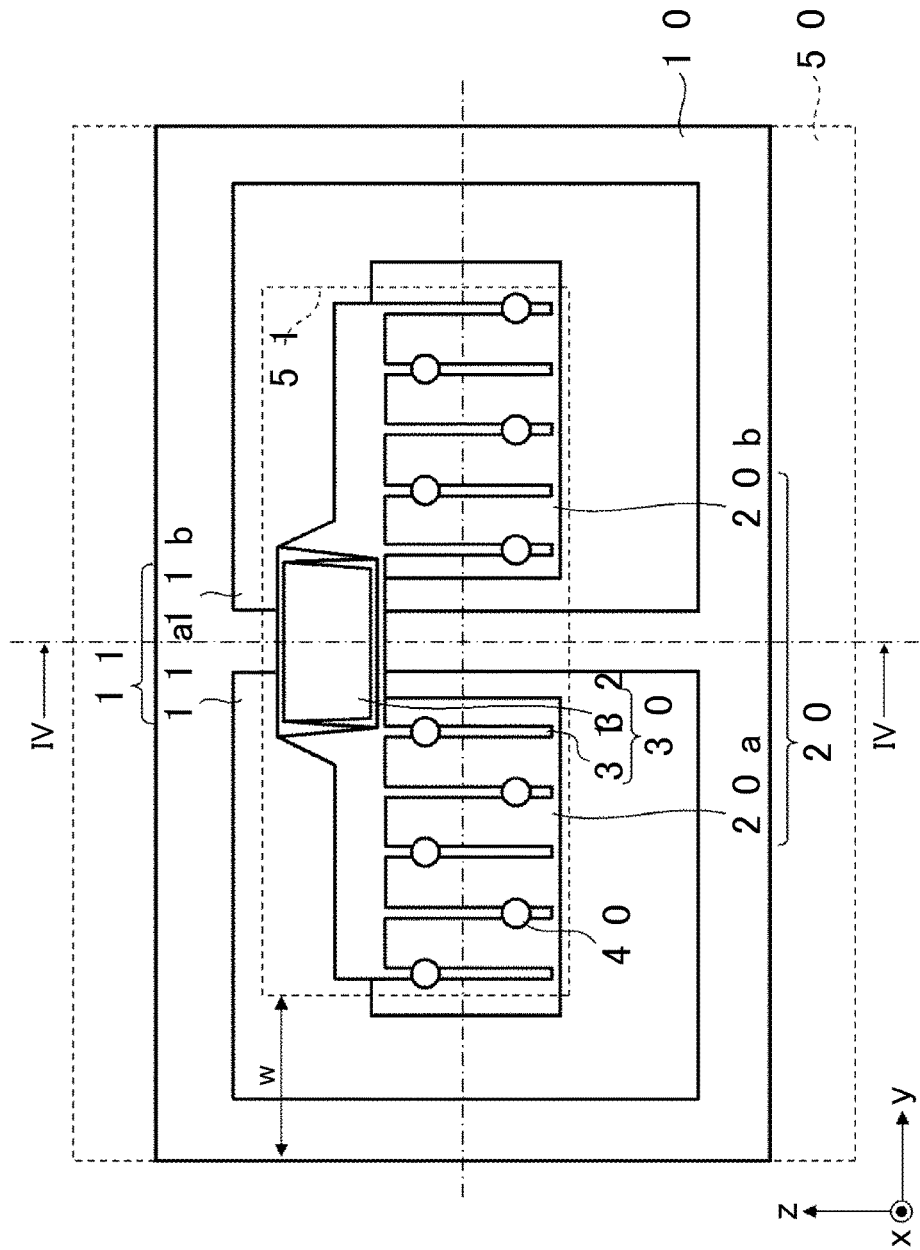
FIG. 3 is a plan view viewed from right above a surface electrode 20 in FIG. 2.
Figure 4:
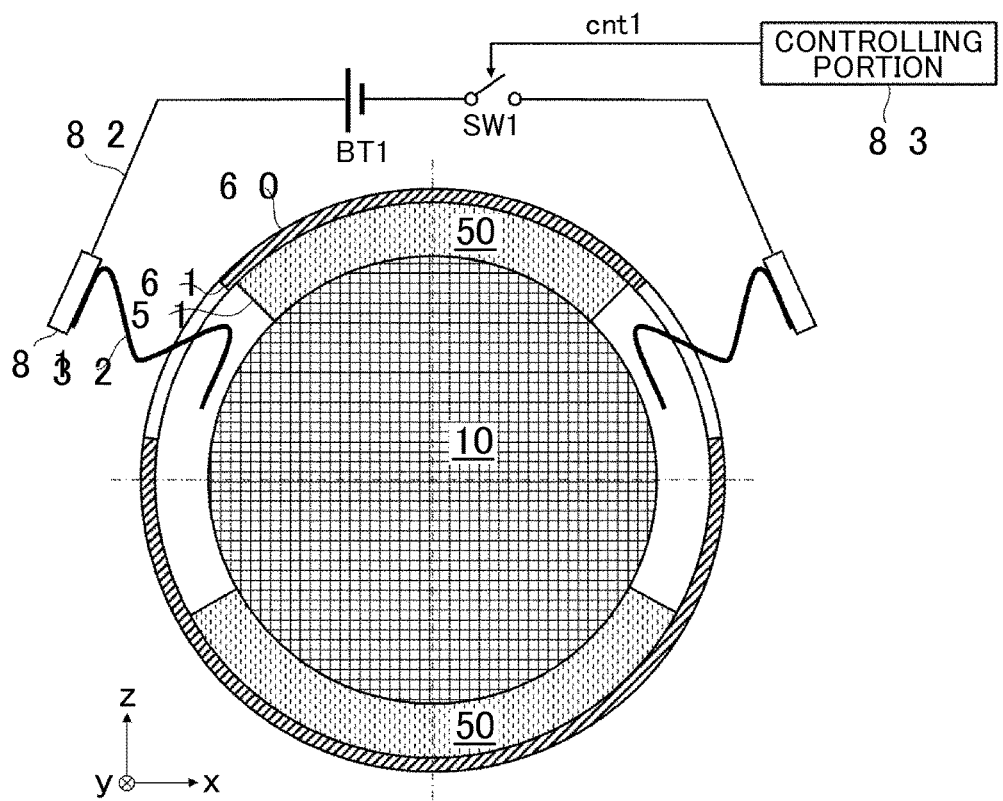
FIG. 4 is a cross-sectional view taken along a cutting plane line IV-IV in FIG. 3.

First described is an electrically heated catalyst device according to a first embodiment with reference to FIGS. 1 to 4. FIG. 1 is a perspective view of the electrically heated catalyst device according to the first embodiment. FIG. 2 is a perspective view in which an outer cylinder 60 is removed from FIG. 1. FIG. 3 is a plan view viewed from right above a surface electrode 20 in FIG. 2 (from a positive side in an x-axis direction). FIG. 4 is a cross-sectional view taken along a cutting plane line IV-IV in FIG. 3.

Naturally, an xyz right handed coordinate system in the figures is illustrated for convenience of description of a positional relationship of constituents. The xyz coordinate in each of the figures is the same, and a y-axis direction corresponds to an axial direction of a carrier 10. Here, at the time when the electrically heated catalyst device 100 is used, it is preferable that a positive orientation in a z-axis direction be along an upward orientation in a vertical direction, as illustrated in FIG. 4.

As illustrated in FIG. 1, the electrically heated catalyst device 100 includes the carrier 10 and the outer cylinder 60. Here, as illustrated in FIG. 2, the electrically heated catalyst device 100 includes electric diffusion layers 11, surface electrodes 20, wiring members 30, and fixing layers 40 on an outer peripheral surface of the carrier 10. Further, as illustrated in FIGS. 3, 4, the electrically heated catalyst device 100 includes a mat 50 between the carrier 10 and the outer cylinder 60. That is, the electrically heated catalyst device 100 includes the carrier 10, the electric diffusion layers 11, the surface electrodes 20, the wiring members 30, the fixing layers 40, the mat 50, and the outer cylinder 60.

Note that the mat 50 is not illustrated in FIG. 1. Further, FIG. 3 illustrates a positional relationship between the carrier 10, the electric diffusion layer 11, the wiring member 30, the fixing layers 40, and the mat 50 in terms of one surface electrode 20, but the same can be said about the other surface electrode 20. More specifically, as illustrated in FIGS. 2, 4, two surface electrodes 20 have a mirror-symmetrical positional relationship across a symmetry plane parallel to a yz plane.

The electrically heated catalyst device 100 is provided on an exhaust passage of an automobile or the like, for example, so as to purify exhaust gas discharged from an engine. In the electrically heated catalyst device 100, the carrier 10 is electrically heated between the surface electrodes 20 provided in pair, so that a catalyst carried by the carrier 10 is activated. Hereby, unburned HC (hydro carbon), CO (carbon monoxide), NOx (nitrogen oxide), and the like in the exhaust gas passing through the carrier 10 are purified by catalytic reaction.

The carrier 10 is a porous member carrying a catalyst such as platinum or palladium. Further, the carrier 10 itself is electrically heated, so it is preferable that the carrier 10 be made of ceramics having an electrical conductivity, more specifically, SiC (silicon carbide), for example. As illustrated in FIG. 2, the carrier 10 is configured such that its outer shape is a generally circular column shape and its inner side has a honeycomb structure. As indicated by a blank arrow, the exhaust gas passes inside the carrier 10 in an axial direction (the y-axis direction) of the carrier 10.

The electric diffusion layer 11 is a ceramics layer having a thickness of around 50 to 200 μm, and is formed on an outer surface of the carrier 10 in order to expand electricity supplied from the wiring member 30 to the axial direction and a circumferential direction of the carrier 10. Here, the electric diffusion layer 11 is made of ceramics having a lower resistance than the carrier 10, and is formed integrally with the carrier 10, for example. More specifically, by adding metal Si to SiC (silicon carbide) that constitutes the carrier 10, for example, it is possible to cause the electric diffusion layer 11 to have a lower resistance than the carrier 10. Naturally, the electric diffusion layer 11 has a higher resistance than the surface electrode 20.

Further, as illustrated in FIG. 2, the electric diffusion layer 11 is formed in a lower layer of each of the wiring members 30 provided in pair. Further, as illustrated in FIG. 3, each of the electric diffusion layers 11 has a rectangular planar shape in total, and is extended in a carrier axial direction (the y-axis direction). Here, the electric diffusion layer 11 is formed so as to expand in the carrier axial direction and the circumferential direction as compared with the surface electrode 20.

In the meantime, in the electrically heated catalyst device 100 according to the present embodiment, the electric diffusion layer 11 is formed so as to be divided into a first region 11a and a second region 11b in the axial direction of the carrier 10. In an electrically heated catalyst device in the related art, the electric diffusion layer 11 is not formed in a divided manner. Because of this, a current concentrates on a central part of the electric diffusion layer 11 at the time when a temperature increases, and intensive heating along with this occurs, which causes an increase in thermal stress. Such a tendency becomes remarkable particularly in a case where the carrier 10 and the electric diffusion layer 11 include SiC, because an electric resistance decreases along with an increase in temperature.

In contrast, in the electrically heated catalyst device 100 according to the first embodiment, the electric diffusion layer 11 is formed so as to be divided into a plurality of regions (the first region 11a and the second region 11b) in the axial direction of the carrier 10. Accordingly, in an ON time of current application to the carrier 10 (at the time when the temperature increases), current concentration to the central part of the electric diffusion layer is dispersed to two regions, i.e., the first region 11a and the second region 11b, which makes it possible to restrain intensive heating as compared with the related art. As a result, a temperature difference between the outer surface of the carrier 10 and the electric diffusion layer 11 in the ON time of the current application is decreased as compared with the related art, which makes it possible to decrease a thermal stress caused therebetween. Accordingly, in the electrically heated catalyst device according to the present embodiment, it is possible to restrain an occurrence of cracks in the carrier due to heat cycles.

The surface electrodes 20 are paired electrodes formed on respective electric diffusion layers 11 and placed so as to be opposed to each other via the carrier 10, as illustrated in FIG. 2. The surface electrode 20 physically makes contact with the electric diffusion layer 11 and is electrically connected to the electric diffusion layer 11. Further, as illustrated in FIG. 3, each of the surface electrodes 20 has a rectangular planar shape and is extended in the carrier axial direction (the y-axis direction). Here, as described above, the electric diffusion layer 11 is formed so as to be divided into the first region 11a and the second region 11b. Because of this, the surface electrode 20 is also formed so as to be divided into a first region 20a and a second region 20b in the axial direction of the carrier 10. Note that the surface electrode 20 may be formed integrally.

Further, the surface electrode 20 is a sprayed coating having a thickness of around 50 to 200 μm formed by plasma spraying, for example. The surface electrode 20 is also electrically conductive similarly to the wiring member 30, so the sprayed coating should be a metal base coating. In order to endure the use under high temperatures of 800° C. or more, metal constituting a matrix of the sprayed coating is preferably Ni—Cr alloy (with a Cr content of 20 to 60 mass %) or MCrAlY alloy (in which M is at least one selected from Fe, Co, Ni) each having an excellent oxidation resistance under high temperatures. Here, the NiCr alloy and the MCrAlY alloy may include other alloy elements.

The wiring members 30 are placed on respective surface electrodes 20, as illustrated in FIG. 3. As illustrated in FIG. 3, the wiring member 30 includes comb-shaped wiring lines 31 provided on the surface electrode 20 so as to extend in a carrier circumferential direction, and a leading portion 32 connected to an external electrode 81 (FIG. 4). For example, the wiring member 30 is a sheet metal generally having a thickness of around 0.1 mm. A width of the comb-shaped wiring line 31 is around 1 mm, for example. Further, in order to endure the use under high temperatures of 800° C. or more, the wiring member 30 is preferably made of heat-resistant (oxidation-resistant) alloy such as stainless alloy, Ni-group alloy, or Co-group alloy, for example. In consideration of cost and performance such as electric conductivity, heat resistance, oxidation resistance under high temperatures, and corrosion resistance in an exhaust-gas atmosphere, the stainless alloy is preferable.

As illustrated in FIG. 3, a plurality of comb-shaped wiring lines 31 is provided over a generally entire formation region of the surface electrode 20, namely, the first region 20a and the second region 20b so as to extend in the carrier circumferential direction, and is also provided side by side at a generally regular interval along the carrier axial direction (the y-axis direction). Here, in an axially central part of the carrier 10, the electric diffusion layer 11 and the surface electrode 20 are not formed, so the comb-shaped wiring lines 31 are not provided, either. Further, all the comb-shaped wiring lines 31 are connected to the leading portion 32 at a positive side in the z-axis direction in the formation region of the surface electrode 20. In the example of FIG. 3, five comb-shaped wiring lines 31 for each of the first region 20a and the second region 20b of the surface electrode 20, that is, 10 comb-shaped wiring lines 31 in total are provided. The comb-shaped wiring lines 31 are fixed to the surface electrode 20 by the fixing layers 40, so as to be electrically connected thereto. Naturally, the number of comb-shaped wiring lines 31 is not limited to 10, but is determined appropriately.

The leading portion 32 is not fixed to the surface electrode 20, but is drawn outside the outer cylinder 60. Here, the leading portion 32 includes a plurality of bending portions so as to be formed in an expandable manner. That is, the leading portion 32 is formed in a bellows shape. In an example of the figure, as illustrated in FIG. 4, for example, the leading portion 32 includes three bending portions (two mountain folds and one valley fold when viewed from the positive side in the z-axis direction), so as to have an M-shaped section. The leading portion 32 may include two bending portions (one mountain fold and one valley fold), so as to have an N-shaped section. Further, the leading portion 32 may have four or more bending portions.

The leading portion 32 having a bellows shape is in a folded state at a stage of manufacturing. Accordingly, the leading portion 32 of the wiring member 30 does not interfere with the outer cylinder 60, thereby making it possible to press the carrier 10 including the wiring member 30 into the outer cylinder 60. After the carrier 10 is pressed into the outer cylinder 60, the leading portion 32 can be easily drawn outside the outer cylinder 60. Here, by use of an annealing material (with an elongation of 15% or more) obtained by annealing a cold-rolled thin plate as the wiring member 30, the leading portion 32 can be easily folded in a bellows shape.

Further, as illustrated in FIG. 4, the wiring member 30 (the leading portion 32) is electrically connected to a battery BT1 via the external electrode 81 and an external wiring line 82. With such a configuration, a current is supplied to the carrier 10, so that the carrier 10 is electrically heated. Here, the battery BT1 is connected in series with a switch SW1. The controlling portion 83 controls ON/OFF of the switch SW1 by a control signal cnt1. That is, the controlling portion 83 controls ON/OFF of current application to the carrier 10. Note that one of the paired surface electrodes 20 is a positive electrode, and the other one of them is a negative electrode, but either of the surface electrodes 20 may be a positive electrode or a negative electrode. That is, an orientation of a current flowing in the carrier 10 is not limited.

The fixing layer 40 is a sprayed coating having a button shape with a thickness of around 300 to 500 μm and formed on the comb-shaped wiring line 31. The fixing layer 40 can be formed such that the wiring member 30 is placed on the surface electrode 20, a masking jig is placed thereon, and plasma spray is performed thereon. A composition or the like of the sprayed coating can be set similarly to the surface electrode 20 described above.

As described above, the comb-shaped wiring lines 31 are fixed to the surface electrode 20 by the fixing layers 40 so as to be electrically connected thereto. In the example of FIG. 3, each of the comb-shaped wiring lines 31 is fixed to the surface electrode 20 by a single fixing layer 40. With such a configuration, it is possible to relax thermal strain (thermal stress) based on a difference in linear expansion coefficient between the wiring member 30 made of metal and the carrier 10 made of ceramics. That is, individual fixing layers 40 are formed to be as small as possible, and provided in a scattered manner. Hereby, the thermal strain (thermal stress) is relaxed. Note that each of the comb-shaped wiring lines 31 may be fixed by two or more fixing layers 40. In this case, the number of fixing layers 40 and an interval therebetween can be determined appropriately.

The mat (a hold member) 50 is a heat insulating member having a flexibility. As indicated by a broken line in FIG. 3, the mat 50 is wound around a whole outer peripheral surface of the carrier 10, and the mat 50 is filled between the carrier 10 and the outer cylinder 60 as illustrated in FIG. 4. The mat 50 allows the carrier 10 to be fixed to and held by the outer cylinder 60, and also allows the carrier 10 to be sealed so that exhaust gas does not leak outside the outer cylinder 60.

As illustrated in FIGS. 3, 4, the mat 50 is provided with two openings 51 to lead the leading portions 32 of the wiring members 30 outside the outer cylinder 60. As illustrated in FIG. 3, the opening 51 is formed in a rectangular shape in an axially central part of the carrier 10 so as to correspond to a formation position of the wiring member 30. Further, in a cross-sectional view illustrated in FIG. 4, the two openings 51 are placed in mirror symmetry with respect to a symmetry plane parallel to the yz plane. In order to secure a sealing characteristic, it is preferable that a frame width w of the opening 51 in the y-axis direction illustrated in FIG. 3 be 30 mm or more. Note that, in the example in the figure, a shape of the opening 51 is a rectangular shape, but is not limited in particular. For example, the shape of the opening 51 may be a round shape or an elliptical shape.

The outer cylinder 60 is a housing for receiving the carrier 10, and is a pipe having a diameter that is one size larger than the columnar carrier 10. As illustrated in FIG. 1, the outer cylinder 60 covers the generally whole carrier 10 via the mat 50. Here, it is preferable that the outer cylinder 60 be made of metal such as stainless alloy, for example.

As illustrated in FIGS. 1, 4, a side surface of the outer cylinder 60 is provided with openings 61 to lead the leading portions 32 of the wiring members 30 outside the outer cylinder 60. Accordingly, as illustrated in FIG. 1, the openings 61 are provided at two parts in an axially central part of the outer cylinder 60 so as to correspond to formation positions of the leading portions 32. Further, in a cross-sectional view illustrated in FIG. 4, the two openings 61 are placed on a slightly upper side relative to a center (on the positive side in the z-axis direction) in mirror symmetry with respect to a symmetry plane parallel to the yz plane. Note that, in the example in the figure, a shape of the opening 61 is a round shape, but is not limited in particular. For example, the shape of the opening 61 may be an elliptical shape or a rectangular shape.

As described above, in the electrically heated catalyst device 100 according to the first embodiment, the electric diffusion layer 11 is formed so as to be divided into the plurality of regions (the first region 11a and the second region 11b) in the axial direction of the carrier 10. Because of this, in an ON time of current application to the carrier 10 (at the time when the temperature increases), current concentration to the central part of the electric diffusion layer is dispersed to two regions, i.e., the first region 11a and the second region 11b, which makes it possible to restrain intensive heating as compared with the related art. As a result, a temperature difference between the outer surface of the carrier 10 and the electric diffusion layer 11 in the ON time of the current application is decreased as compared with the related art, which makes it possible to decrease a thermal stress caused therebetween. Accordingly, in the electrically heated catalyst device according to the present embodiment, it is possible to restrain an occurrence of cracks in the carrier due to heat cycles.

Next will be described a manufacturing method of the electrically heated catalyst device 100 according to the first embodiment, with reference to FIGS. 2 and 4. Initially, as illustrated in FIG. 2, the surface electrode 20 (the first region 20a and the second region 20b) is formed by plasma spray, for example, on the electric diffusion layer 11 formed integrally with the carrier 10 so as to be divided into the first region 11a and the second region 11b. Subsequently, the wiring member 30 including the leading portion 32 folded in a bellows shape is placed on the surface electrode 20, and then, the fixing layers 40 are formed on the wiring member 30 by plasma spray using a masking jig. Hereby, the wiring member 30 is fixed onto the surface electrode 20.

Subsequently, as illustrated in FIG. 4, the mat 50 having the opening 51 corresponding to a formation region of the wiring member 30 is wound on the outer peripheral surface of the carrier 10 on which the surface electrode 20, the wiring member 30, and the fixing layer 40 are formed. Here, the leading portion 32 is still folded in a bellows shape.

Then, the carrier 10 around which the mat 50 is wound is pressed into the outer cylinder 60. After that, the leading portion 32 folded in a bellows shape is stretched out, so as to draw the leading portion 32 outside the outer cylinder 60 through the opening 61. Finally, the leading portion 32 is fixed to the external electrode 81 with screw tightening, welding, or the like. According to the above steps, the electrically heated catalyst device 100 according to the first embodiment can be obtained as illustrated in FIG. 4.

Modification of First Embodiment

Figure 5:
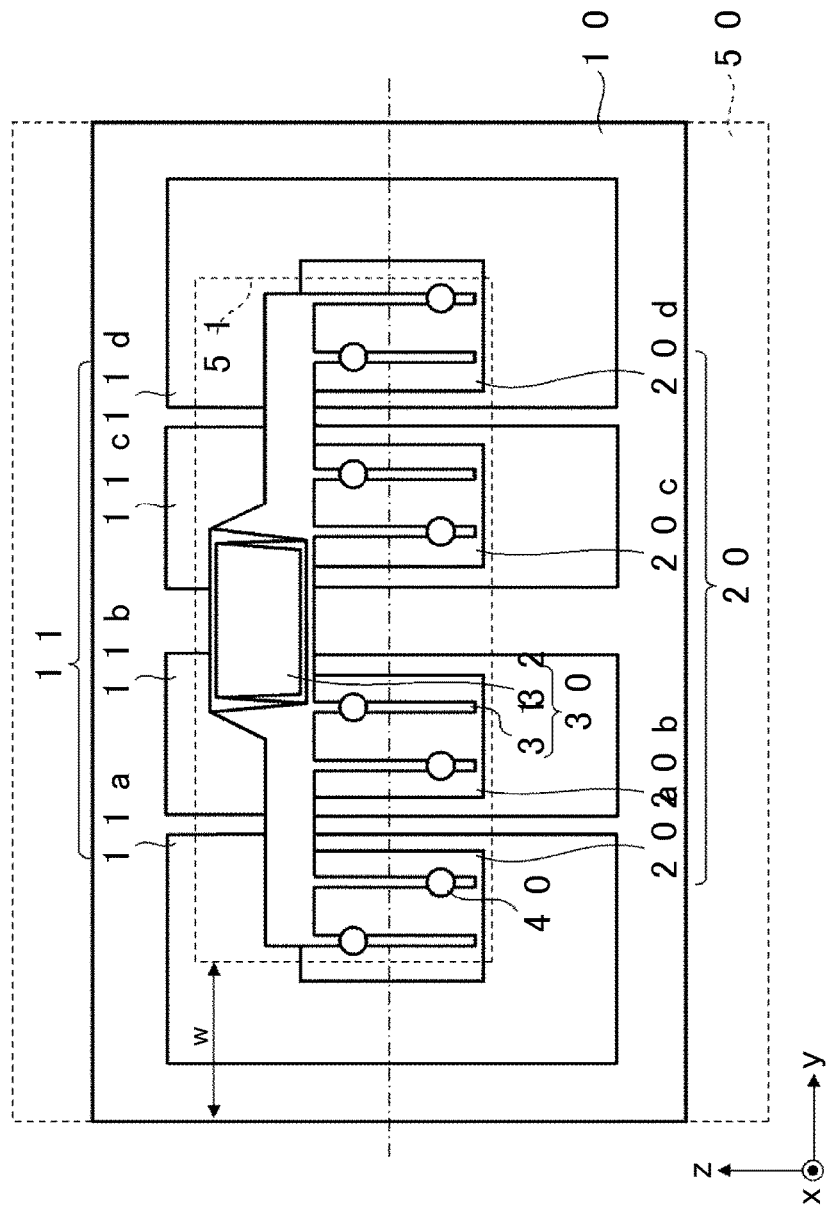
FIG. 5 is a plan view of an electrically heated catalyst device according to a modification of the first embodiment.

Next will be described an electrically heated catalyst device according to a modification of the first embodiment, with reference to FIG. 5. FIG. 5 is a plan view of the electrically heated catalyst device according to the modification of the first embodiment. FIG. 5 corresponds to FIG. 3. As illustrated in FIG. 5, in the electrically heated catalyst device according to the modification of the first embodiment, an electric diffusion layer 11 is divided into four regions, i.e., a first region 11a, a second region 11b, a third region 11c, and a fourth region 11d. A first region 20a, a second region 20b, a third region 20c, and a fourth region 20d of a surface electrode 20 are formed, respectively, on the first region 11a, the second region 11b, the third region 11c, and the fourth region 11d of the electric diffusion layer 11. Further, two comb-shaped wiring lines 31 are provided in each of the regions of the surface electrode 20.

In the electrically heated catalyst device according to the modification of the first embodiment, the electric diffusion layer 11 is formed so as to be divided into four regions (the first region 11a, the second region 11b, the third region 11c, the fourth region 11d) in an axial direction of a carrier 10. Because of this, in an ON time of current application to the carrier 10 (at the time when a temperature increases), current concentration to a central part of the electric diffusion layer is dispersed to four regions, i.e., the first region 11a, the second region 11b, the third region 11c, and the fourth region 11d, which makes it possible to further restrain intensive heating as compared with the first embodiment. As a result, a temperature difference between an outer surface of the carrier 10 and the electric diffusion layer 11 in the ON time of the current application is further decreased, which makes it possible to further decrease a thermal stress caused therebetween. Accordingly, it is possible to more effectively restrain an occurrence of cracks in the carrier due to heat cycles.

Second Embodiment

Figure 6:
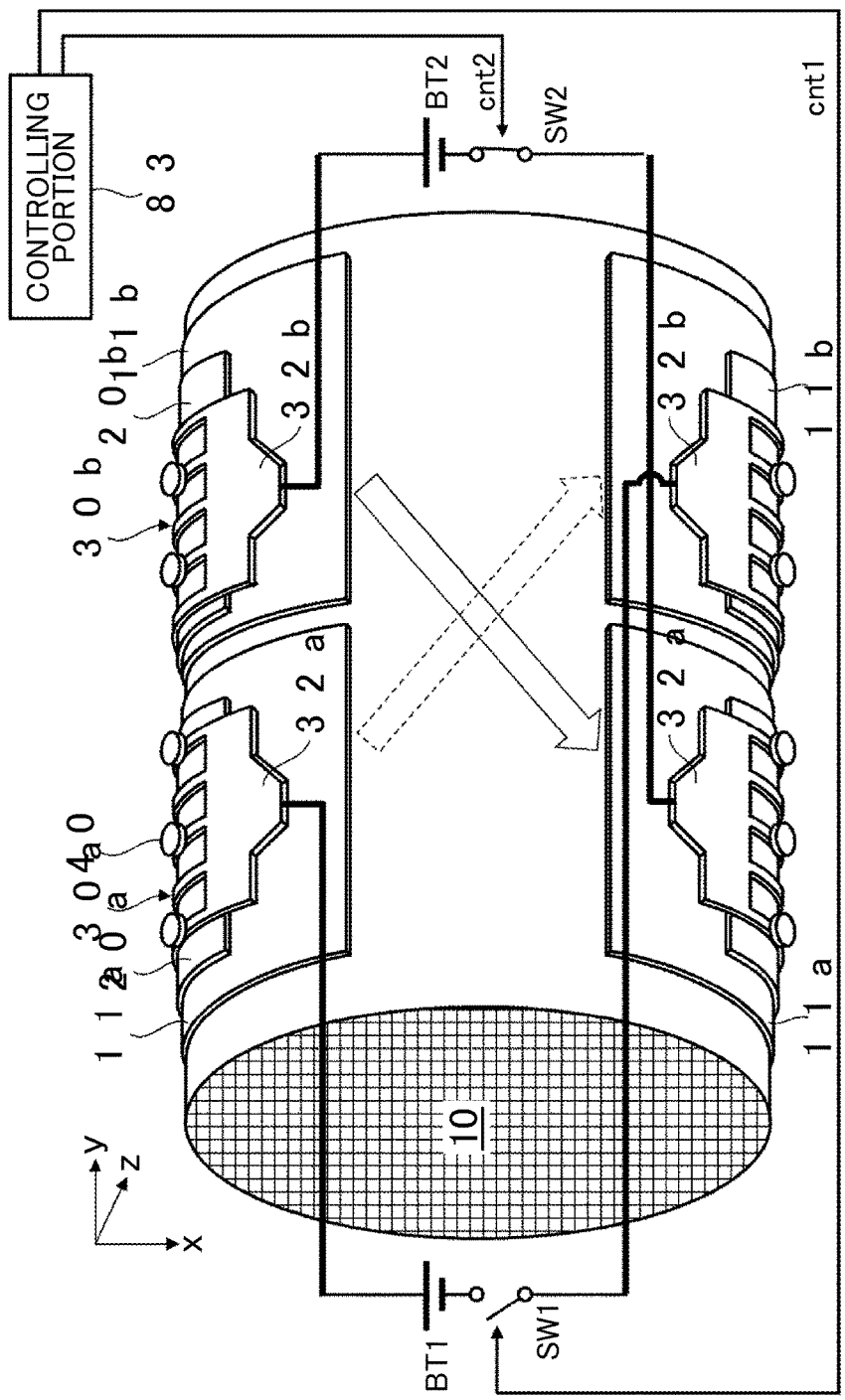
FIG. 6 is a perspective view of an electrically heated catalyst device according to a second embodiment.
Figure 7:
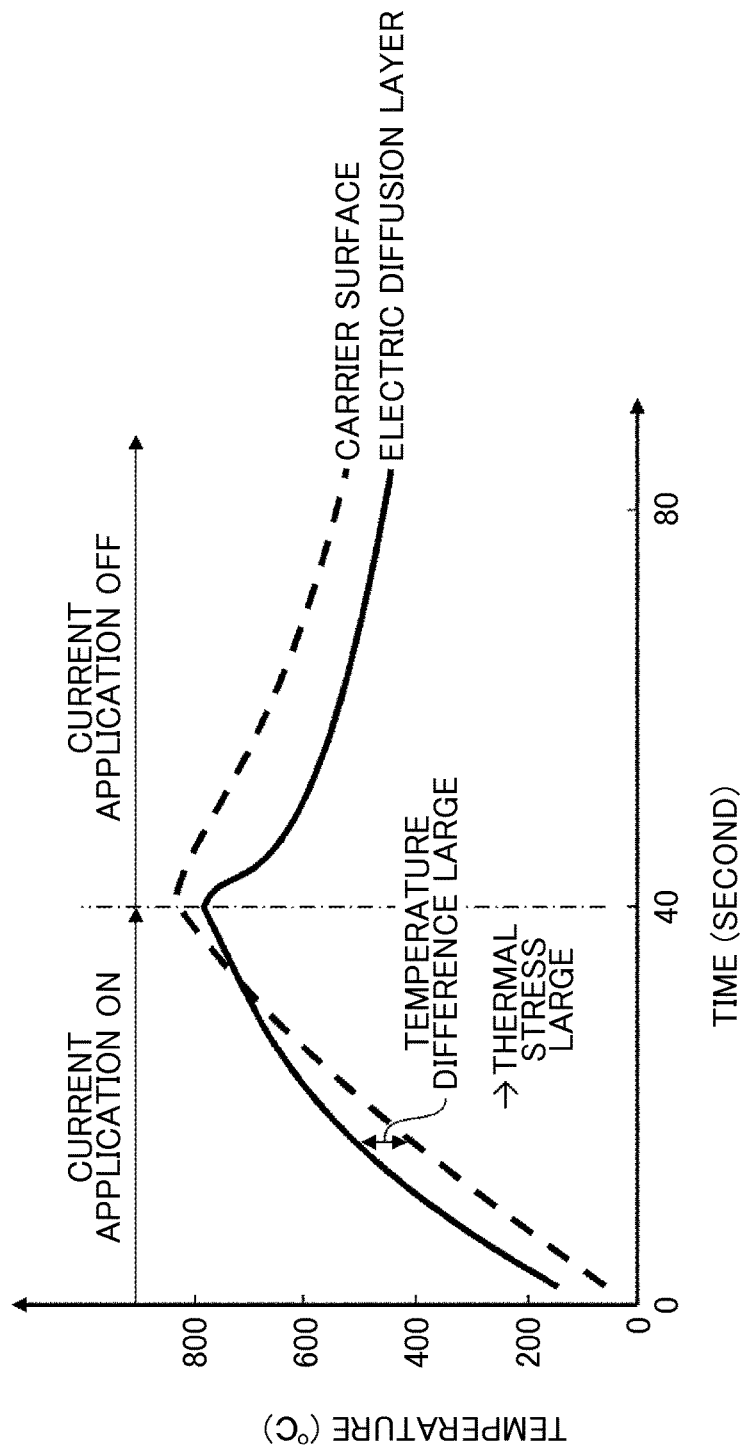
FIG. 7 is a graph illustrating temperature changes of a carrier and an electric diffusion layer in an electrically heated catalyst device in a related art.

Next will be described an electrically heated catalyst device according to a second embodiment with reference to FIG. 6. FIG. 6 is a perspective view of the electrically heated catalyst device according to the second embodiment. FIG. 6 corresponds to FIG. 2. As illustrated in FIG. 6, in the electrically heated catalyst device according to the second embodiment, first wiring members 30a are formed on respective first regions 20a of surface electrodes 20, and second wiring members 30b are formed on respective second region 20b of the surface electrodes 20. That is, wiring members 30 are each formed so as to be physically and electronically divided into the first wiring member 30a and the second wiring member 30b. Here, the first wiring members 30a are placed so as to be opposed to each other via a carrier 10. Further, the second wiring members 30b are placed so as to be opposed to each other via the carrier 10.

As illustrated in FIG. 6, a leading portion 32a of the first wiring member 30a on an upper side in the figure (a negative side in the x-axis direction) is connected to a leading portion 32b of the second wiring member 30b on a lower side in the figure (a positive side in the x-axis direction) via a battery BT1 and a switch SW1. By such an electric circuit, the carrier 10 can be electrically heated. A direction of a current flowing in the circuit is indicated by a broken line arrow in FIG. 6.

In the meantime, a leading portion 32b of the second wiring member 30b on the upper side in the figure (the negative side in the x-axis direction) is connected to a leading portion 32a of the first wiring member 30a on the lower side in the figure (the positive side in the x-axis direction) via a battery BT2 and a switch SW2. By such an electric circuit, the carrier 10 can be electrically heated. A direction of a current flowing in the circuit is indicated by a continuous line arrow in FIG. 6.

As such, in the electrically heated catalyst device according to the second embodiment, the first region 11a and the second region 11b of respective electric diffusion layers 11 which are diagonally opposed to each other via the carrier 10 are electrically connected to each other. Hereby, two electric circuits are formed. That is, paired electric diffusion layers of one electric circuit are placed in an alternated manner in an axial direction of the carrier 10 (the paired electric diffusion layers are displaced from each other in the axial direction). A controlling portion 83 controls ON/OFF of the switch SW1 by a control signal cnt1, and also controls ON/OFF of the switch SW2 by a control signal cnt2. Here, the controlling portion 83 controls ON/OFF of the switch SW1 and the switch SW2 so as to alternately apply a current to the two electric circuits. For example, the controlling portion 83 switches ON/OFF of the switch SW1 and the switch SW2 every several seconds. Note that FIG. 6 illustrates a state where the switch SW1 is turned off and the switch SW2 is turned on. Since the other configuration is similar to the first embodiment, a description thereof is omitted.

In the electrically heated catalyst device according to the second embodiment, the electric diffusion layer 11 is formed so as to be divided into the first region 11a and the second region 11b, similarly to the electrically heated catalyst device according to the first embodiment. Further, the two electric circuits are operated alternately, so as to repeat heat generation and heat dissipation in one electric circuit. That is, heat generation in the electric circuit is not continued. Accordingly, in an ON time of current application to the carrier 10 (at the time when the temperature increases), current concentration to a central part of the electric diffusion layer and intensive heating along with this can be restrained more than the first embodiment. As a result, a temperature difference between the outer surface of the carrier 10 and the electric diffusion layer 11 in the ON time of the current application is decreased as compared with the related art, which makes it possible to decrease a thermal stress caused therebetween. Accordingly, in the electrically heated catalyst device according to the present embodiment, it is possible to further effectively restrain an occurrence of cracks in the carrier due to heat cycles.

Note that the present invention is not limited to the above embodiments, and various modifications can be made within a range that does not deviate from a gist of the present invention.

What is claimed is:

1. An electrically heated catalyst device comprising:
    a carrier configured to carry a catalyst;
    a pair of electric diffusion layers formed on an outer peripheral surface of the carrier so as to be opposed each other, each of the electric diffusion layers being formed so as to be divided into a plurality of regions in an axial direction of the carrier;
    wiring members each fixed to each of the electric diffusion layers, the carrier being electrically heated via the wiring members; and
    a controller configured to control current application to the carrier, wherein:
    each of the electric diffusion layers is formed so as to be divided into two regions in the axial direction of the carrier;
    the wiring member fixed to the two regions is formed so as to be divided electrically from each other;
    two electric circuits are provided, and in each of the two electric circuits, two regions of the electric diffusion layers, which are diagonally opposed to each other via the carrier, are electrically connected to each other; and
    the controller alternately applies a current to the two electric circuits.

2. The electrically heated catalyst device according to claim 1, wherein the carrier and the electric diffusion layers contain SiC.

* * * * *